Aug. 20, 1940.  C. C. BROWN  2,211,845
MEANS FOR EQUIPPING WELLS UNDER PRESSURE
Filed Nov. 9, 1933  6 Sheets-Sheet 1

Inventor
Cicero C. Brown.
By Jesse R. Stone
& Lester B. Clark
Attorneys

Aug. 20, 1940.   C. C. BROWN   2,211,845
MEANS FOR EQUIPPING WELLS UNDER PRESSURE
Filed Nov. 9, 1933   6 Sheets—Sheet 2

Inventor
Cicero C. Brown.
Jesse R. Stone
Lister B. Clark
By
Attorney

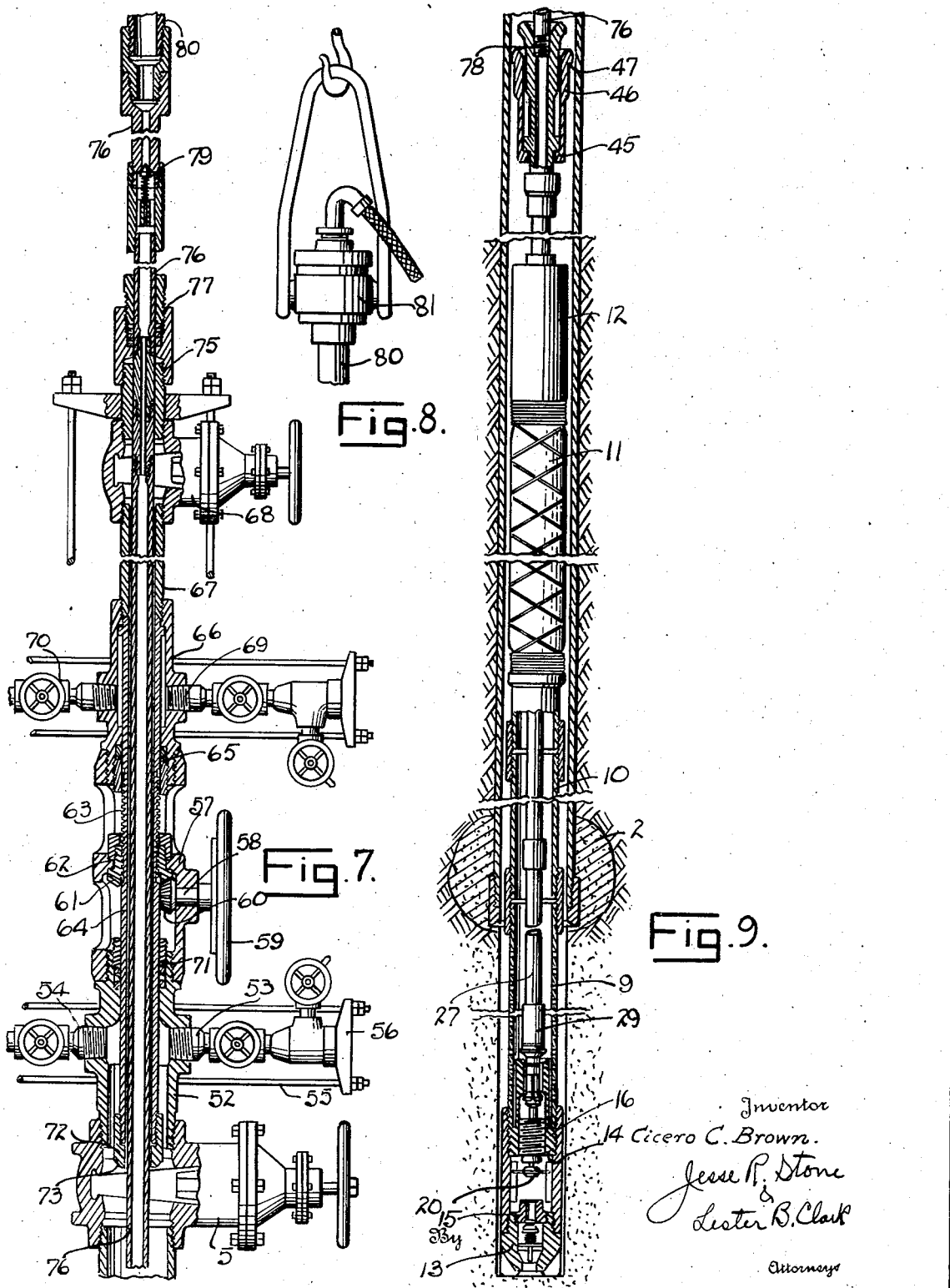

Aug. 20, 1940.  C. C. BROWN  2,211,845
MEANS FOR EQUIPPING WELLS UNDER PRESSURE
Filed Nov. 9, 1933   6 Sheets—Sheet 4
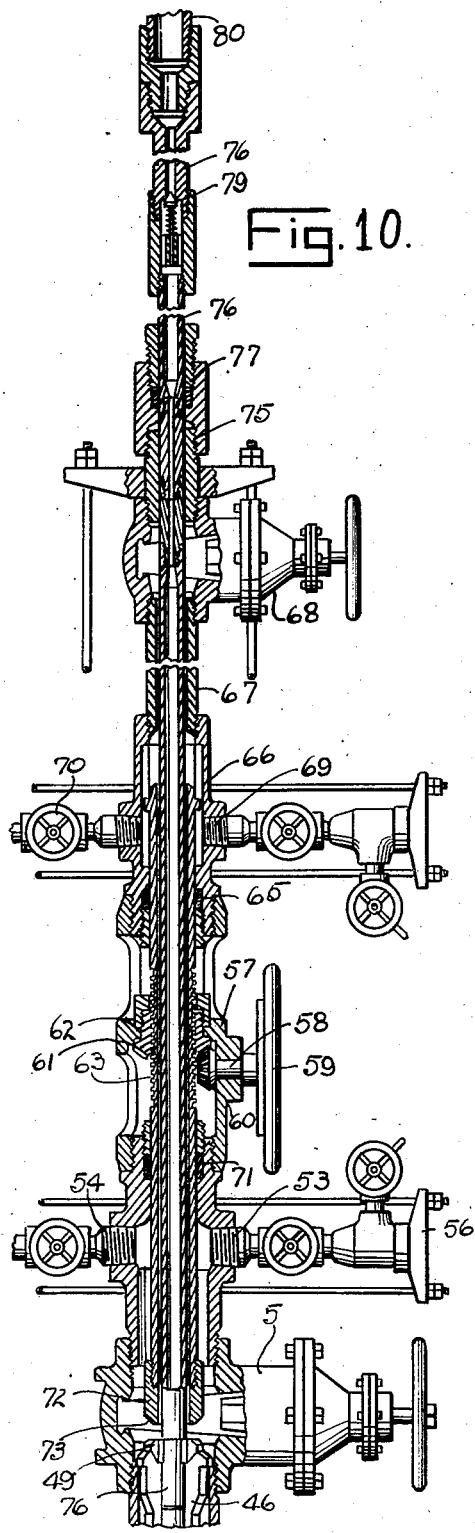
Fig. 10.
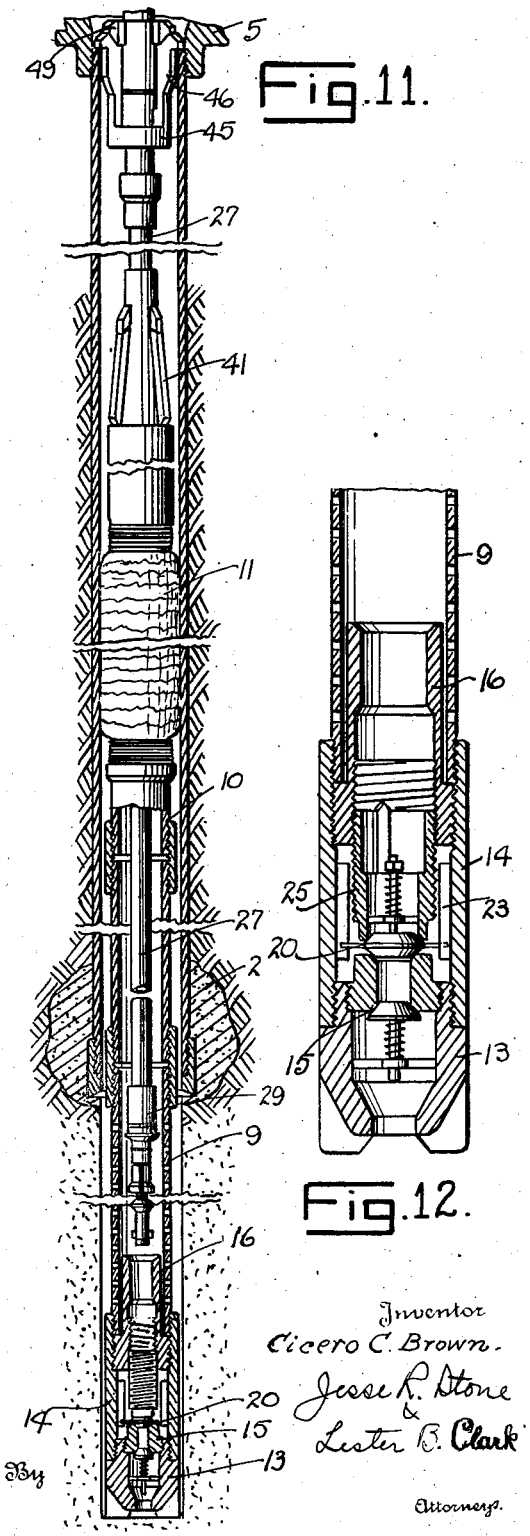
Fig. 11.
Fig. 12.
Inventor
Cicero C. Brown
Jesse R. Stone
&
Lester B. Clark
By
Attorneys.

Aug. 20, 1940.   C. C. BROWN   2,211,845
MEANS FOR EQUIPPING WELLS UNDER PRESSURE
Filed Nov. 9, 1933   6 Sheets-Sheet 5

Inventor
Cicero C. Brown.
By Jesse R. Stone
&
Lister B. Clark
Attorneys

Aug. 20, 1940.　　　C. C. BROWN　　　2,211,845
MEANS FOR EQUIPPING WELLS UNDER PRESSURE
Filed Nov. 9, 1933　　　6 Sheets—Sheet 6

Inventor
Cicero C. Brown.
Jesse R. Stone
&
Lester B. Clark
By
Attorneys

Patented Aug. 20, 1940

2,211,845

UNITED STATES PATENT OFFICE 2,211,845

MEANS FOR EQUIPPING WELLS UNDER PRESSURE

Cicero C. Brown, Houston, Tex.

Application November 9, 1933, Serial No. 697,275

3 Claims. (Cl. 166—20)

My invention relates to the equipping of wells, particularly in oil and gas wells where it is necessary to bring in the well under gas pressure.

It is more or less common, particularly in deep wells, to find the producing stratum filled with gas under high pressure. Therefore, extreme precautions must be taken in setting the screen and washing the well and hanging the tubing therein, in order to prevent the blowing in of the well and resulting damage to equipment, that the well be under control at all times so that the gas may not escape. It is not uncommon for the well to be damaged or entirely lost due to failure to control the escape of the gas during the proper equipping of the well.

It is an object of my invention to provide an apparatus which enables the operator to maintain a strict seal both within the casing and the tubing so that at no time during the necessary operations of setting the screen and the packer and hanging the tubing will the well be open so that the gas may escape.

I also contemplate a method of handling the bringing in of the well to prevent possibility of the gas or oil escaping from the well during any period in the process.

The apparatus which I have devised has novel features in the construction of the equipment at the upper end of the well and also in the equipment at the lower end of the well which enables the well to be washed under strict control and to enable the packer to be set and the Christmas tree and other equipment at the upper end of the well attached thereto and the flow line properly positioned, all without any danger of a blowout. The invention therefore resides in the particular arrangement and construction of the apparatus by means of which the noted operations are accomplished, and reference is made to the drawings wherein a full disclosure of the construction will be found.

Fig. 7 is a side view partly in central longitudinal section showing the equipment employed in washing the well.

Fig. 8 is a side elevation of the swivel which is employed with the Fig. 7 construction.

Fig. 9 is a side view partly in elevation and partly in central longitudinal section showing the apparatus at the lower end of the well, this view being a continuation of the view shown in Fig. 1.

Figs. 10 and 11 are views similar to those shown in Figs. 7 and 8 but illustrating a different step in the process.

Fig. 12 is an enlarged view of the apparatus at the lower end of Fig. 11.

Figure 1:
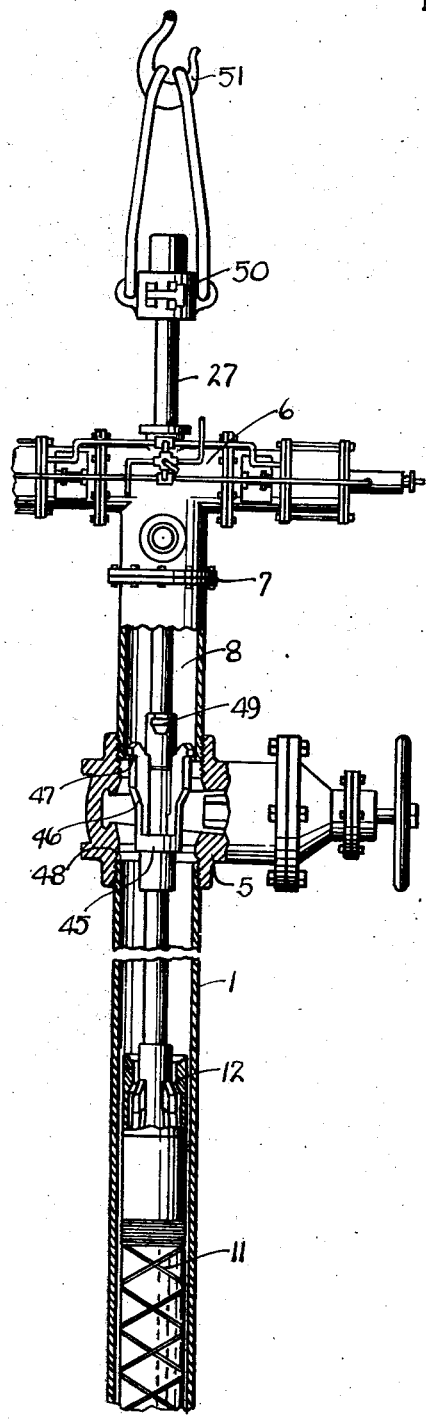
Fig. 1 is a side view partly in central vertical section of the apparatus at the upper end of the well during the first operations in equipping the same.

In the usual equipment which is employed in a well there is at least one string of pipe indicated at 1, which acts as a casing for the well. Only one string of casing is shown although it is to be understood that several strings may be employed. This casing forms a lining for the interior of the well and its lower end is ordinarily sealed against the wall of the well by cement, as shown at 2. Below the casing in Fig. 2 the well, at 3, is indicated as being an open hole extending downwardly into the producing sand 4. The upper end of the casing may be variously equipped. In Fig. 1 is shown a gate valve 5 of ordinary construction which may be employed to close off the upper end of the casing when the inner string is absent.

Above the gate valve 5 the well is shown as equipped with a blowout preventer 6, which is attached to the upper end of the casing by flanges, as shown at 7. The blowout preventer indicated in the drawing is intended to illustrate any ordinary type of blowout preventer, the one shown being equipped for operation by steam or air and is understood as being constructed to close the space between the upper end of the casing and the tubing to prevent the escape of fluid from the interior of the casing, shown at 8, upwardly out of the well. The exact construction of this blowout preventer is not material and the same is therefore shown in a conventional manner.

Figure 2:
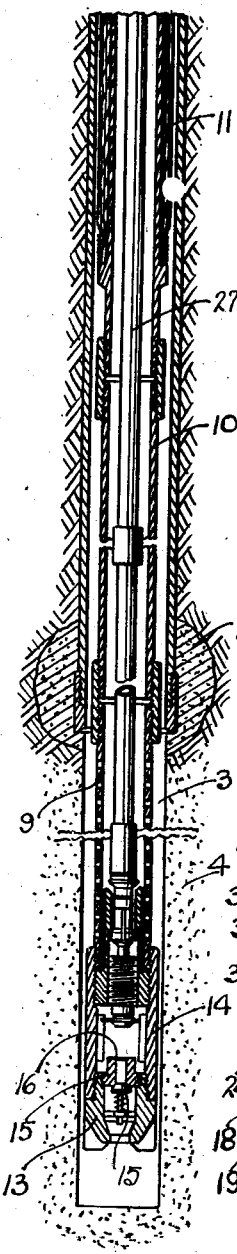
Fig. 2 is a central longitudinal section through the apparatus at the lower end of the well, this view being a continuation of that shown in Fig. 1.
Figure 3:
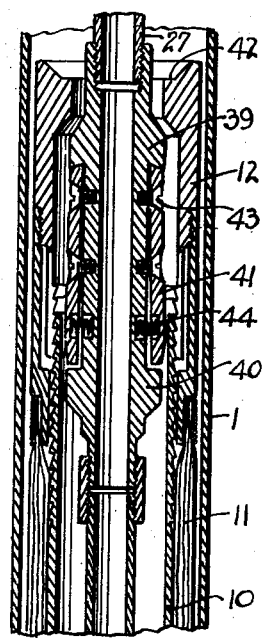
Fig. 3 is a central longitudinal section through the packer setting apparatus.

The setting of the strainer in the well after the casing has been properly set and equipped is the next operation in finishing the well. The strainer shown at 9 in Fig. 2 is connected at the lower end of a liner 10, toward the upper end of which is a packer 11, said packer being a canvas packer of the ordinary construction and shown as being tightly wrapped about the liner 10.

At the upper end of the packer the liner has a collar or sleeve 12 telescoping thereover and contacting with the upper end of the packer so that it may be employed to force the packer into collapsed position to pack off the space between the upper end of the liner and the casing.

In order to handle the liner and strainer I have equipped the lower end of the strainer with an apparatus which enables the successful sealing off of the lower end of the tubing during the initial steps in the setting operation. I have a lower guide shoe 13 connected to the lower end of the strainer by a nipple 14. The shoe 13 has a back pressure valve 15 of any desired type set therein. I have shown the upper end of the back pressure valve assembly as formed with a seat indicated at 16a.

Figure 4:
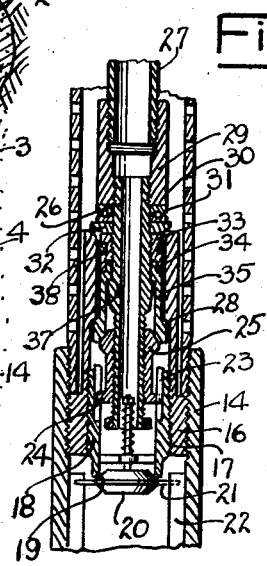
Fig. 4 is a similar section through the lower end of the strainer showing the attachment of the tubing thereto.

As will be seen from Fig. 4, there is a specially constructed sleeve 16 screwed within the upper end of the nipple 14 and extending upwardly into the strainer for a short distance. This sleeve is threaded interiorly at 17 to receive a valve housing 18, the lower end of which is formed into a seat 19 to receive the upper end of the valve 20. Said valve has two laterally extending arms 21 which are arranged to engage against stationary fins or keys 22 extending inwardly from the face of the nipple 14. This enables the valve to be moved longitudinally in the nipple but prevents its rotation therein. As the sleeve is rotated relative to the valve, the seat at 19 is kept clear and a seal between the valve and seat is assured. At the upper end of the valve housing there are provided opposite keyways 23 to receive keys 24 on the lower end of the bushing 25 mounted upon the lower end of the extension 26 of the tubing 27.

On the interior of the sleeve 16 at its upper end the wall is cut away at 28 to form a shoulder, the purpose of which will presently appear.

The tubing 27 is connected to the extension 26 by means of a coupling 29 having thickened walls, the lower end of which forms a shoulder 30 below which is placed a ball race 31. The extension 26 is threaded within the lower end of the coupling 29 and the ball race 31 is fitted about the outer periphery thereof. Below the ball race is a plate 32 which rests upon a ring 33 threaded on the outer surface of the extension and having a downwardly extending skirt 34 to engage about the upper ends of a plurality of dogs 35. Said dogs are extended inwardly at their upper end and are suspended upon a shoulder 37 on the outer periphery of the extension 26.

The apparatus here described forms the subject matter of a separate invention disclosed in my co-pending application Serial No. 681,915, filed July 24, 1933, now Patent No. 2,110,355, granted March 8, 1938. It enables the tubing to be secured to the lower end of the strainer and to the upper end of the set shoe. This is accomplished by screwing the bushing 25 upwardly against the inner faces of the dogs 35 and forcing them outwardly to engage beneath the shoulder 28 on the sleeve 16. A packing ring 38 in the outer face of the ring 33 forms a sealing engagement with the interior of the sleeve 16. Thus, when the device is lowered into the well, the lower end of the tubing is sealed by the valve 20 and it will be seen that any fluid entering above the valve and through the openings in the strainer may not enter the tubing 27 because of the sealing engagement of the ring 38 with the interior of the sleeve 16. However, when the tubing or set pipe 27 is to be released from the strainer this may be done by the rotation of the same to screw the bushing 25 downwardly away from the lower ends of the dogs 35, thus allowing them to drop inwardly and allow the tubing to be withdrawn.

The tubing 27 is of the usual type. It has at a point upwardly away from its connection with the strainer a setting tool 39 thereon, which comprises a tubular section having a thickened wall connected into the line of the tubing. In the outer face of the thickened portion are longitudinal projections 40 which are recessed between their ends and slightly undercut at the upper ends of said recess and adapted to receive plates 41, which form dogs adapted when forced outwardly at their lower ends to engage upon a shoulder 42 at the upper end of the packing expanding sleeve 12.

The dogs 41 are secured in the recesses, formed in the thickened portions of the tool, by means of cap screws 43 which engage loosely in openings in the plate so as to allow the plate to be moved outwardly at its lower end. The lower end normally is adapted to be swung outwardly by means of a coiled spring 44 set in sockets in the inner face of the dog and the outer wall of the recess. The packer is adapted to be collapsed in the usual manner. The setting tool is drawn upwardly above the collar 12 so as to allow the dogs to be expanded and the tool is then lowered to engage the weight upon the said collar and thus force it downwardly to collapse the packer. It is to be understood that any ordinary type of packer may be employed.

The tubing is equipped adjacent its upper end with a hanger 45. This comprises a collar slidable on the tubing adapted to be seated upon a coupling on the tubing and having upwardly extending arms 46, the upper ends of which have shoulders 47 which, when expanded, may engage on the upper end of the casing as shown at 48. These dogs may be expanded for connection with the upper end of the casing by means of opposed expanding wedge members 49 on the tubing above the hanger. The tubing 27 above the hanger is projected through the upper end of the blowout preventer and may be engaged, by means of an elevator 50, with the lower end of the hook on the traveling block as shown at 51.

In lowering the strainer with the liner and packer thereon down to position at the bottom of the well, the device is assembled as described and shown in Figs. 1 to 4, inclusive. While the device is lowered, the blowout preventer 6, is ready to prevent the escape of gas and to preserve a seal about the tubing.

Figure 5:
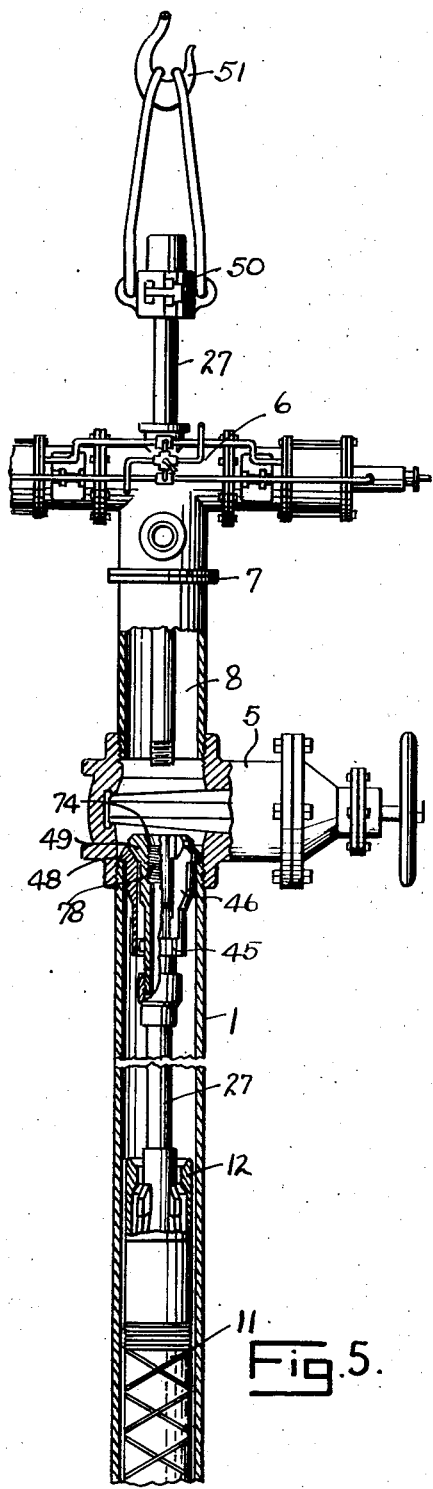
Figs. 5 and 6 are views similar to Figs. 1 and 2 showing the apparatus in slightly different position to indicate the next step in the operation of setting the screen.
Figure 6:
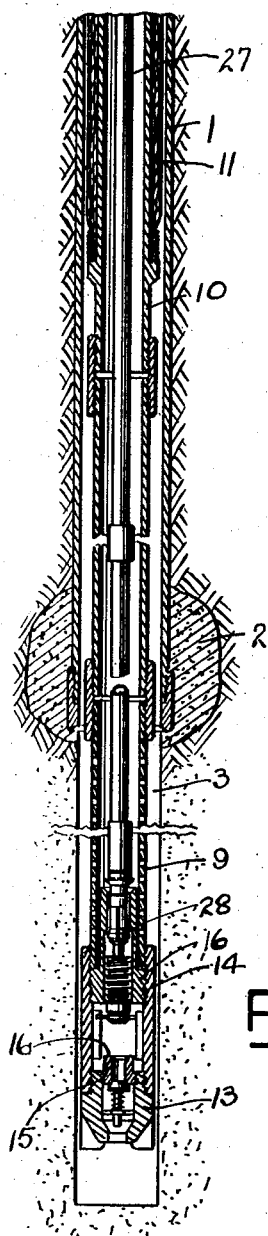

When the strainer is thus in place the tubing and the assembly supported thereby are anchored at the upper end of the casing as shown in Fig. 5. This is done by lowering the hanger until the shoulders 47 are against the upper end 48 of the casing. With the expanding lugs 49 out of contact with the arm 46, the body 45 to which the resilient arms 46 are integrally connected, may be engaged by means on the tubing 21 and forced downwardly into the casing. The shoulders 47 may engage against the upper ends of casing sections, but as the arms are yieldable, the arms will give inwardly and allow the shoulders 47 to snap by such projections. The shoulders may, however, be held into engagement with the ends of the casing sections, and this is accomplished as follows: The hanger is first moved downwardly to bring the shoulders 47 against the end of the casing section 48. The tubing is then rotated into position to bring the expanding members 49 upon the tubing into engagement with the interior of the arms 46 to force them outwardly and hold them in clamping engagement with the upper end of the casing. This will be understood from Fig. 5. The upper end of the tubing is then unscrewed from within the upper section adjacent the hanger, as shown in Fig. 5, and the same may then be drawn upwardly, as shown, to a point slightly above the gate valve 5. This valve is then closed, as indicated in Fig. 5, and the upper section of the tubing may be drawn upwardly through the blowout preventer, leaving the well entirely closed by the gate valve 5.

When the valve is thus closed the control head or equivalent is then secured to the casing in the place of the blowout preventer. That is, the blowout preventer is removed down to the section connected with the gate valve 5. This may safely be done due to the fact that the well is closed by the gate valve. The assembly which is then secured above the gate valve is shown in Fig. 7. It includes the equipment shown in my Patent No. 1,921,115 issued August 8, 1933, and will now be briefly described. There is a lower head 52 which is connected with the upper end of the valve 5 and has two lateral openings therein into which are connected flow lines 53 and 54. These lines are shown as equipped with valves and connections in the usual manner, which need not be here described or considered. They allow an outlet from the casing at this point when desired. The side outlets are shown as being held and reinforced by a yoke consisting of transverse rods 55 and a cross head 56.

Above the head 52 is a frame member 57 which supports a short rotatable shaft 58 extending radially outwardly and having a handwheel 59 thereon. The inner end of the shaft has a beveled gear 60 adapted to cooperate with a gear 61 at the lower end of a nut 62 held rotatably in position by the frame member and having a threaded engagement upon the outer surface 63 of a tubular pipe section 64. It will be obvious that when the nut 62 is rotated by means of a handwheel the tubular section 64 may be raised or lowered as desired. The upper end of the section 64 is unthreaded and extends through a stuffing box 65 into a flow head 66, the upper end of which is threaded interiorly for connection by means of a pipe 67 with the lower end of a gate valve 68. There are lateral openings from the head 66 to receive the flow line members 69 and 70, through which fluid from the well may find an outlet under control.

The lower end of the movable section 64 is extended through a stuffing box 71 and has at its lower end a valve head 72, the lower end of which is beveled at 73 for engagement with the seat 74, shown in Fig. 5.

The gate valve 68 has a short upward extension 75 closed about an inner pipe 76 by means of a stuffing box 77. The pipe 76 forms a conduit for flushing fluid pumped into the well.

The conduit 76 is to be employed in the strainer setting and washing operation only. It has the lower end threaded to engage within the upper threaded seat 78 in the tubing adjacent the hanger, as shown in Fig. 5. It fits closely within the movable extension 64 in the tubing extension and is slidable through the stuffing box 77 at the upper end of the apparatus. It has a check valve 79 through the interior passage which prevents the fluid from escaping upwardly therethrough. Above the check valve the line is connected with the pipe 80, which is attached to the swivel 81 through which flushing fluid may be pumped downwardly into the well to clean the same in the cleaning operation. When the well has been thus equipped to wash the strainer, the conduit pipe 76, which is connected as described with the swivel 81, is lowered to a position immediately above the gate valve, about as shown in Fig. 5. With the parts in this position the gate valve may be opened as it will be seen that all outlets from the casing or the tubing are closed and sealed against the escape of fluid. When the gate valve 5 is opened, the flow line is screwed into the upper seat 74 in the tubing head. The interior of the well may then be washed.

After this attachment has been made between the line 76 and the tubing head 74, the hanger is again disengaged from the upper end of the casing so that it may pass downwardly therein. This is done by an upward pull on the tubing and a partial rotation thereof to allow the arms 46 on the hanger to move inwardly and release the shoulders 47 from the casing. The parts will then be in position approximately as shown in Fig. 1. When the tubing is then lowered the hanger may move past the upper end of the casing, as shown in Fig. 9, thus allowing the tubing to be screwed downwardly and manipulated in the releasing of the tubing from the lower end of the screen.

The attachment of the tubing to the lower end of the screen will be as shown in Fig. 4 and the flow of fluid past the back pressure valve 20 into the well around the screen may readily take place so that the lower end of the well may be washed. The fluid pumped downwardly through the tubing may enter the screen and pass upwardly within the liner and casing and an outlet may be provided therefor through the openings 53 and 54. When the well has thus been washed on the outside the outlets 53 and 54 may be closed and the tubing may be detached from its engagement at the lower end of the screen. With reference particularly to Figs. 4 and 12, this operation may be now noted. The tubing will be rotated to screw the lower bushing 25 downwardly to release the dogs 35 and also to screw the valve housing 18 downwardly. When this housing has been moved so that the lower face of the valve 20 engages the seat 16a at the upper end of the back pressure valve said valve 20 will be tightly clamped between the two seats 19 and 16a and will be absolutely locked against the entrance of liquid at that point. As the dogs 35 will be released the tubing may then be drawn upwardly out of the sleeve, thus opening the lower end of the tubing into the screen. Fluid may then be pumped downwardly through the tubing to wash the interior of the screen after which the packer may be set.

The packer is set in the usual manner by drawing the line of tubing upwardly to allow the dogs 41 to expand outwardly above the setting collar 12 after which the tubing may be lowered to force the collar down and expand the packer into the position shown in Fig. 11.

With the packer expanded the tubing may be again employed to engage the hanger 45 with the upper end of the casing as shown in Fig. 11. Thus the tubing will be supported on the hanger at the same time that the dogs 41 of the packer expanding device contacts with the upper end of the packer expanding sleeve.

It will be understood that while these operations are going on the upper end of the well will be sealed off against the escape of liquid either through the casing or the tubing by the equipment shown in Figs. 7 and 10, as previously described. The setting line 76 may then be removed. This will be accomplished by unscrewing the connection at the lower end thereof with the upper end of the tubing below the gate valve 5, and withdrawing the same sufficiently to allow the gate valve to be closed. This closing of the gate valve will seal off the upper end of the well while the line 76 is entirely withdrawn upwardly through the stuffing box 77 from the well. The upper gate valve 68 will then be closed and the well will be ready for operation. With the gate valve 68 closed the valve 5 will be opened and the handwheel 59 may be manipulated to screw the movable extension 64 downwardly to seat the lower end 73 thereof within the seat 74 in the tubing adjacent the hanger. When thus seated, the flow through the tubing will be permitted as shown in Fig. 13.

Figure 13:
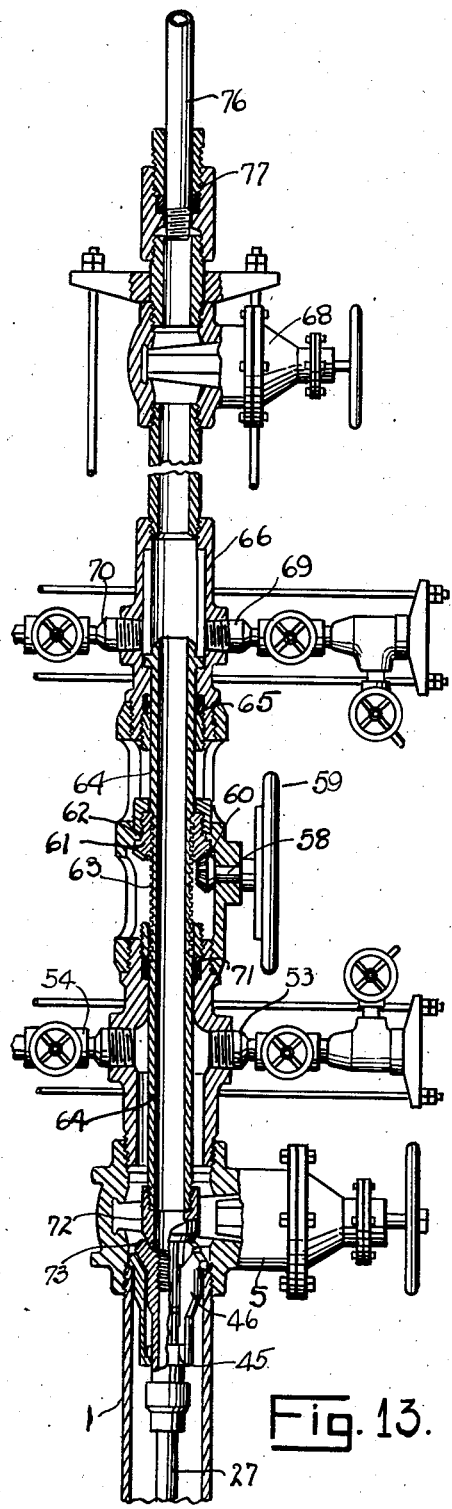
Fig. 13 is a side view partly in central vertical section showing the upper end of the well equipped as is shown in Fig. 10 but with the pump connections removed therefrom.

In this Fig. 13 the setting line 76 has not been moved upwardly out of the stuffing box 77 but with the valve 68 closed the pipe 76 may be entirely removed. By an inspection of Fig. 13 it will be now seen that the fluid from the casing may pass upwardly around the hanger and may find an outlet through either of the lateral openings 53 or 54 as desired. The flow from the tubing may be upwardly through either of the outlets 69 or 70. The valve 68 will be retained in closed position.

Figure 14:
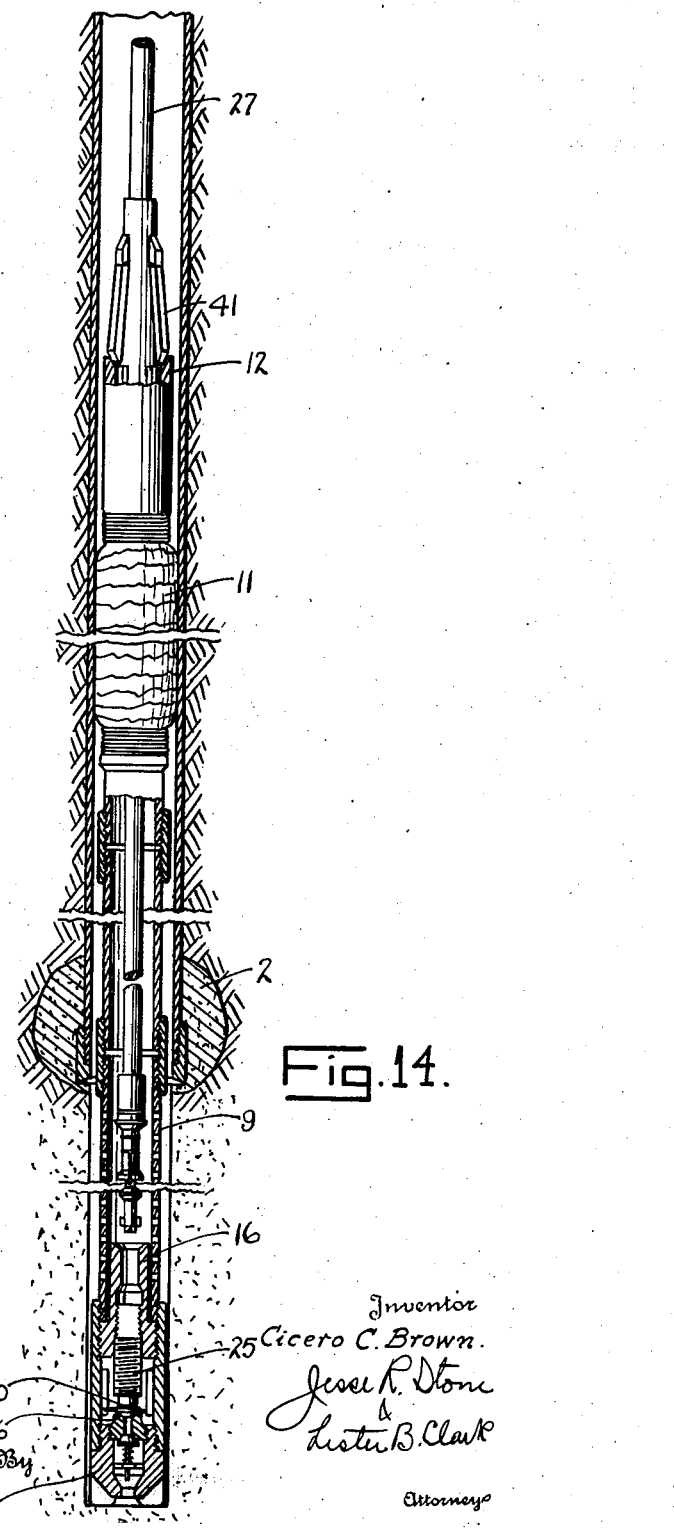
Fig. 14 shows the apparatus at the lower end of the well as connected with the apparatus shown in Fig. 13.

If at any time it becomes necessary to repair either of the flow lines making up the Christmas tree, the flow from the well may be entirely cut off by raising the extension 64 to a point above the gate valve 5 and closing that valve. With the apparatus thus equipped it will be obvious that the well may be flowed through any of its outlets and when necessary or desirable the entire flow from the well may be cut off so that any desirable changes or repairs may be made. The lower end of the tubing will be in a position within the screen, as shown in Fig. 14, and if operations are necessary at the lower end of the well it will be possible to again introduce the setting line 76 and close off the entrance of liquid to the tubing at the lower end in the manner already noted.

Figure 15:
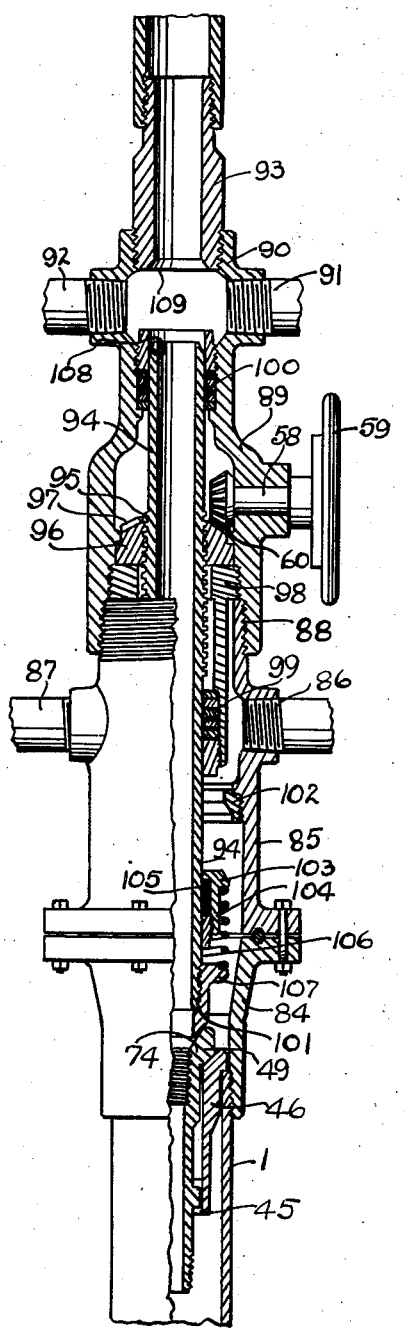
Fig. 15 is a side view partly in longitudinal section showing a different embodiment of the apparatus which may be employed at the upper end of the well during the setting operation.

In Fig. 15, I have shown one alternative type of apparatus which may be employed at the upper end of the well and in which construction the gate valve 5 may be omitted. The casing 1 is connected at its upper end with a special collar or coupling 84, which is flanged for connection with the casing head 85, which has lateral outlets 86 and 87. The upper end of this head is threaded for connection at 88 with the frame member 89. This frame supports the rotatable shaft 58 with the handwheel 59 thereon and the beveled gear 60 on the inner end thereof. At the upper end of the frame member 89 the diameter thereof is reduced to form a head 90 having lateral outlets 91 and 92, said head having an upward connection with the flow line 93.

Within the frame member 89 is the tubing extension 94, which is threaded at 95 for engagement with the rotatable nut 96 having teeth 97 thereon to engage with the beveled gear 60 whereby the nut may be rotated. Said nut is held rotatably in position by a sleeve 98 screwed within the frame member 89 and extending downwardly within the casing head 85. It has a fluid tight engagement with the extension 94 by means of a stuffing box 99.

The upper end of the extension also is sealed about by means of a stuffing box 100 formed on the inner wall of the frame member 89.

The lower end of the extension member 94 has a valve member 101 thereon which is adapted to seal within the seat 74 in the tubing head.

On the inner face of the casing below the outlets 86 and 87, I have screwed a valve seat member 102. This seat is presented downwardly and is adapted to cooperate with a valve 103 mounted slidably upon the lower end of the extension 94.

As will be noted from the drawing the valve member 103 is recessed at its lower end to receive packing adapted to be compressed by a ring 104, which forms a gland to compress the packing rings 105 against the outer surface of the tubular extension. I provide a spring 106 between the valve member and the shoulder 107 on the valve head which normally holds the valve in position spaced upwardly from the said shoulder.

It is also to be noted that the upper end of the extension 94 is beveled at 108 to fit within a seat 109 in the lower end of the section 93 of the flow line.

In the operation of this device I am enabled to close off the outlets 86 by moving the section 94 upwardly to bring the valve 103 into the seat 102. Simultaneously the upper end of the section 94 is engaged with the seat 109 to close off the outlets 91 and 92. I am enabled to adjust the extension 94 to close both valves accurately due to the resilient mounting of the valve 103. It is thus possible, if repairs are to be made on any of the outlets 86, 89, 91 and 92, to close those outlets by a movement of the extension 94. It is contemplated that a valve may be placed in the line 93 wherever desired in a manner such as is shown at the upper end of Fig. 13. With this apparatus the well may be brought in without the use of all the equipment shown in the embodiments previously noted.

Figure 16:
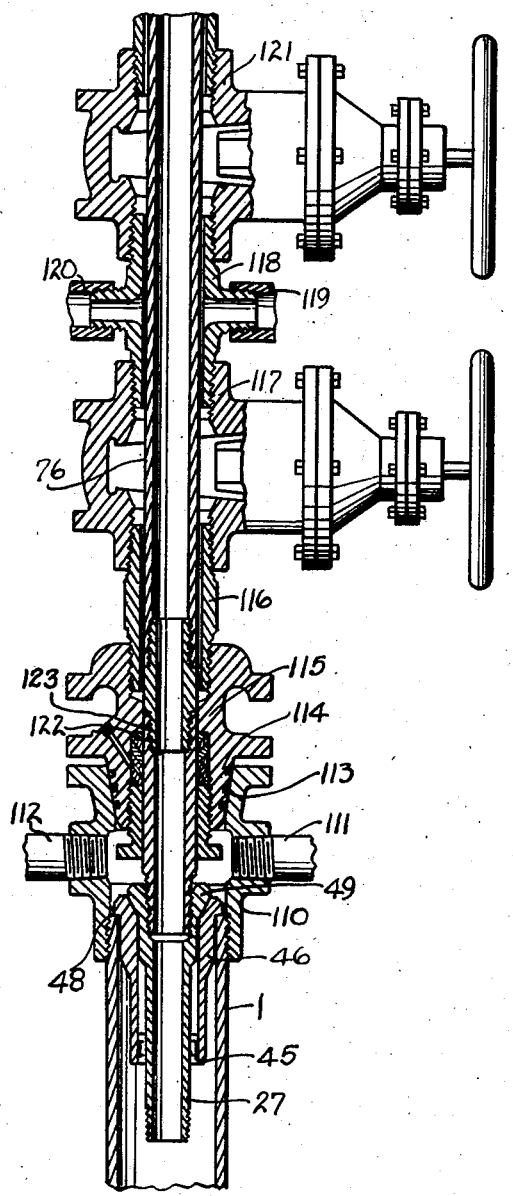
Fig. 16 is a still different embodiment of the casing head equipment which may be employed.

In Fig. 16 a still different embodiment of the invention is shown. The casing 1 is connected to a casing head 10 having lateral outlets 111 and 112 and having a tapered seat at 113 above the outlet. This tapered seat is arranged to receive the lower tapered end 114 of the head 115. The upper end of the said head 115 is connected by a nipple 116 with a valve 117 above which is a head 118 having lateral outlets 119 and 120; above this head may be placed a second control valve 121.

The flow line extension 76 is adapted to have a sealing fit with the interior of the head 115 by means of a stuffing box 122, thus providing against escape of fluid from the casing head upwardly above the outlets 111 and 112. It is possible to release the extension 76 and remove the same for closing of either of the valves 117 or 121 by unscrewing the connection at 123 with the upper end of the tubing head and withdrawing the extension 76 upwardly a sufficient distance to allow the closing of either of said valves.

It will be obvious that although this particular arrangements has some advantages in ease of operation, it does not combine all the factors of safety in the handling of the parts which may be obtained by the device originally shown and described.

The particular advantage arising from my improved apparatus is that all of the operations ordinarily necessary or desirable to be accomplished in setting the screen and packer and washing the well may be accomplished without any possibility of escape of gas during these operations. It is also possible, after it has been properly washed and equipped at the lower end, to employ the pipe which is employed in performing these operations as a tubing for the well. I also provide an effective support for the tubing both in the hanger and at the upper end of the packer which forms a stable support and anchor allowing the flowing of the well and the later equipment thereof with the pumping apparatus. During the flowing operations it is possible to shut off any desired outlets from the well while repairs are necessary. This is an improvement which prevents the necessity of mudding up the well or killing the well through mud pressure when repairs on the Christmas tree are necessary.

The combination of the equipment at the upper and lower ends of the well by means of which safety in the operation of the well is provided forms the particular distinctive feature of this invention and while specific embodiments are disclosed it is understood that changes may be made coming within the scope of the appended claims.

What I claim as new is:

1. In an apparatus for equipping wells having a casing therein, a strainer, a tubing connected to the lower end of said strainer, a hanger for said tubing at its upper end, a flow head connected with said casing, a conduit for fluid in washing said screen, said conduit extending through said flow head and adapted to detachably connect with said tubing, a check valve in said conduit, a seal in said flow head about said conduit, means to close the upper end of said flow head when said conduit is withdrawn and a tubing extension slidable in said head to seat on said tubing adjacent said hanger.

2. A combination tubing hanger, gate valve and tubing seal comprising a body having a shank thereon adapted to be supported in the casing head, means to support a string of pipe in said shank, and means passing downwardly through the tubing seal and said shank to engage said means to move the string of pipe during the washing of the well and to thereafter position the string of pipe to be supported by said first means.

3. A combination tubing hanger, valve, and tubing seal comprising a body having a part thereon adapted to be supported on a casing head, means to support a string of pipe in said part, and means passing downwardly through the tubing seal and said part to move the string of pipe during the washing of the well and to thereafter position the string of pipe to be supported by said first means.

CICERO C. BROWN.